(12) United States Patent
Choi et al.

(10) Patent No.: US 8,988,758 B2
(45) Date of Patent: Mar. 24, 2015

(54) THERMOCHROMIC WINDOW DOPED WITH DOPANT AND METHOD OF MANUFACTURING THE SAME

(71) Applicant: Samsung Corning Precision Materials Co., Ltd., Gyeongsangbuk-do (KR)

(72) Inventors: Yong Won Choi, ChungCheongNam-Do (KR); Yung-Jin Jung, ChungCheongNam-Do (KR); Dong Gun Moon, ChungCheongNam-Do (KR); Jee Yun Cha, ChungCheongNam-Do (KR)

(73) Assignee: Samsung Corning Precision Materials Co., Ltd. (KR)

( * ) Notice: Subject to any disclaimer, the term of this patent is extended or adjusted under 35 U.S.C. 154(b) by 0 days.

(21) Appl. No.: 13/926,119

(22) Filed: Jun. 25, 2013

(65) Prior Publication Data

US 2014/0002886 A1    Jan. 2, 2014

(30) Foreign Application Priority Data

Jun. 27, 2012 (KR) .................... 10-2012-0069383

(51) Int. Cl.
*G02F 1/01* (2006.01)
*C23C 16/00* (2006.01)
(Continued)

(52) U.S. Cl.
CPC .............. *G02F 1/009* (2013.01); *C03C 17/245* (2013.01); *C03C 17/3417* (2013.01);
(Continued)

(58) Field of Classification Search
CPC ............. G02F 1/00; G02F 1/009; G02F 1/01; C23C 14/08; C23C 14/34; C23C 14/352; C23C 16/00; B32B 9/00; B32B 27/06; C03C 3/122; C03C 3/125; C03C 3/21; C03C 17/245; C03C 17/3417; C03C 17/3618; C03C 17/3681; C03C 25/10; C03C 25/223; C03C 25/226

USPC ................ 359/288, 289, 604; 427/160, 162, 427/163.1, 164, 126.3, 109, 96.8, 402, 427/248.1, 256; 428/34, 141, 212, 328, 428/332, 404, 472, 408, 432, 701
See application file for complete search history.

(56) References Cited

U.S. PATENT DOCUMENTS 4,401,690 A * 8/1983 Greenberg .................... 65/60.52
6,440,592 B1 * 8/2002 Meyer et al. .................. 428/701
(Continued)

FOREIGN PATENT DOCUMENTS

EP           2514726 A2    10/2012
JP        2006206398 A     8/2006
(Continued)

OTHER PUBLICATIONS

Jin P et al: "Tungsten doping into vanadiun dioxide thermochromic films by high-energy ion implantation and thermal annealing", Thin Silid Films, Elsevier-Sequoia S.A Lausanne, CH, vol. 324, No. 1-2, Jul. 1, 1998, pp. 151-158, XP004147814, ISSN : 0040-6090, DOI: 10.1016/S0040-6090(98) 00362-9.
(Continued)

*Primary Examiner* — Loha Ben
(74) *Attorney, Agent, or Firm* — Lerner, David, Littenberg, Krumholz & Mentlik, LLP

(57) ABSTRACT

A thermochromic window doped with a dopant and a method of manufacturing the same. The thermochromic window includes a substrate and a thermochromic thin film formed on the substrate. The thermochromic thin film has a thermochromic material doped with a dopant, the concentration of the dopant gradually decreasing in a depth direction from one surface of the upper surface and the undersurface of the thermochromic thin film. The thermochromic window has a high level of visible light transmittance and high phase change efficiency while having a low phase transition temperature.

13 Claims, 2 Drawing Sheets

(51) Int. Cl.
  *B32B 9/00* (2006.01)
  *B32B 27/06* (2006.01)
  *G02F 1/00* (2006.01)
  *C03C 17/245* (2006.01)
  *C03C 17/34* (2006.01)

(52) U.S. Cl.
  CPC ...... *C03C 17/3435* (2013.01); *C03C 2217/212* (2013.01); *C03C 2217/218* (2013.01); *C03C 2217/228* (2013.01); *C03C 2217/288* (2013.01); *C03C 2217/91* (2013.01); *C03C 2218/32* (2013.01)
  USPC ....... 359/288; 359/604; 427/248.1; 427/96.8; 427/126.3; 427/162; 427/163.1; 428/472; 428/701; 428/432; 428/212

(56) References Cited

U.S. PATENT DOCUMENTS

| | | | |
|---|---|---|---|
| 6,872,453 B2* | 3/2005 | Arnaud et al. | 428/432 |
| 7,311,976 B2* | 12/2007 | Arnaud et al. | 428/432 |
| 8,197,721 B2* | 6/2012 | Stuart et al. | 252/520.4 |
| 8,270,060 B2* | 9/2012 | Moon et al. | 359/288 |
| 8,422,113 B2* | 4/2013 | Moon et al. | 359/288 |
| 8,562,025 B2* | 10/2013 | Drinkwater | 283/94 |
| 8,609,253 B2* | 12/2013 | Chang et al. | 428/472 |
| 2002/0037421 A1 | 3/2002 | Arnaud et al. | |
| 2005/0254130 A1* | 11/2005 | Graf et al. | 359/604 |
| 2011/0080631 A1 | 4/2011 | Moon et al. | |
| 2011/0122478 A1 | 5/2011 | Lee et al. | |
| 2012/0263943 A1 | 10/2012 | Jung et al. | |
| 2013/0141774 A1* | 6/2013 | McCarthy | 359/288 |
| 2013/0164511 A1* | 6/2013 | Bae et al. | 428/212 |
| 2013/0215490 A1* | 8/2013 | Donval et al. | 359/288 |
| 2013/0335803 A1* | 12/2013 | Bae et al. | 359/288 |
| 2013/0342888 A1* | 12/2013 | Donval et al. | 359/288 |

FOREIGN PATENT DOCUMENTS

| | | |
|---|---|---|
| JP | 2008-297177 | 12/2008 |
| KR | 10-2011-0036488 | 4/2011 |

OTHER PUBLICATIONS

Office action issued on Dec. 22, 2014 regarding family KR Patent Application No. 10 2012 0069383.

* cited by examiner

THERMOCHROMIC WINDOW DOPED WITH DOPANT AND METHOD OF MANUFACTURING THE SAME

CROSS REFERENCE TO RELATED APPLICATION

The present application claims priority from Korean Patent Application Number 10-2012-0069383 filed on Jun. 27, 2012, the entire contents of which application are incorporated herein for all purposes by this reference.

BACKGROUND OF THE INVENTION

1. Field of the Invention

The present invention relates to a thermochromic window doped with a dopant and a method of manufacturing the same, and more particularly, to a thermochromic window doped with a dopant and a method of manufacturing the same, in which the thermochromic window has a low phase transition temperature.

2. Description of Related Art

In response to soaring prices of chemical energy sources such as petroleum, the necessity for the development of new energy sources is increasing. In addition, the importance of energy saving technologies is increasing with the necessity for new energy sources. In fact, at least 60% of energy consumption in common houses is attributed to heating and/or cooling. In particular, common houses and buildings lose up to 24% of their energy through windows.

Accordingly, a variety of attempts have been made in order to reduce the amount of energy that is lost through windows by increasing the airtightness and insulation characteristics thereof while maintaining the aesthetics and the characteristics of view, which are the basic functions of windows. Representative methods, by way of example, include varying the size of the windows and furnishing high-insulation windows.

Types of high insulation window glass include an argon (Ar) injected pair-glass, in which Ar gas or the like is disposed between a pair of glass panes in order to prevent heat exchange, a low-e glass, and the like. Also being studied is a type of glass that is coated with a layer that has specific thermal characteristics in order to adjust the amount of solar energy that is introduced.

In particular, the low-e glass is coated, on the surface thereof, with a thin layer of metal or metal oxide, which allows most visible light that is incident on the window to enter, so that the interior of a room can be kept bright, while radiation in the infrared (IR) range can be blocked. The effects of this glass are that it prevents the heat of heating from leaking to the outside, and also prevents the energy of heat outside a building from entering, thereby reducing cooling and heating bills. However, this window has the following drawbacks due to its characteristic of reflecting wavelengths other than visible light. Specifically, it does not admit the IR range of sunlight into the interior of a room, which is a drawback, especially in winter, and the sunlight transmittance thereof is not adjusted according to the season and/or temperature.

Accordingly, the development of technologies for thermochromic windows which are provided by coating a glass with a thermochromic material is underway. Such a thermochromic window blocks near infrared (NIR) radiation and infrared (IR) radiation while allowing visible light to pass through when the glass arrives at a predetermined temperature or higher, thereby preventing room temperature from rising.

FIG. 1 is a graph showing variations in the level of sunlight transmittance of a thermochromic window before and after the phase transition, in which one surface of a glass substrate is coated with a thermochromic thin film made of $VO_2$.

As shown in FIG. 1, it can be appreciated that, when the glass is coated with the thermochromic material, the transmittance of the glass for solar light, in particular, in an IR range differs before and after phase transition. This can consequently improve the energy efficiency when cooling and heating a building.

However, it is difficult to put thermochromic materials into practice in actual construction glass, since they have a high phase transition temperature. In particular, even the phase transition temperature of vanadium dioxide ($VO_2$) which is relatively close to the practically available temperature is 68° C.

Accordingly, a thermochromic thin film made of a thermochromic material is doped with a dopant in order to lower the phase transition temperature of the thermochromic thin film.

Doping methods of the related art include a method of co-sputtering a target made of a thermochromic material and a target made of a dopant and a method of sputtering a thermochromic material using a target that is doped with a dopant.

However, these methods have a problem in that the dopant is uniformly dispersed and distributed across the entire area of the thermochromic thin film, thereby decreasing the level of visible light transmittance and phase transition efficiency of the thermochromic thin film.

The information disclosed in the Background of the Invention section is provided only for better understanding of the background of the invention, and should not be taken as an acknowledgment or any form of suggestion that this information forms a prior art that would already be known to a person skilled in the art.

BRIEF SUMMARY OF THE INVENTION

Various aspects of the present invention provide a thermochromic window doped with a dopant and a method of manufacturing the same, in which the thermochromic window has a high level of visible light transmittance and high phase change efficiency while having a low phase transition temperature.

In an aspect of the present invention, provided is a thermochromic window that includes: a substrate and a thermochromic thin film formed on the substrate. The thermochromic thin film has a thermochromic material doped with a dopant, the concentration of the dopant gradually decreasing in a depth direction from one surface of the upper surface and the undersurface of the thermochromic thin film.

In an embodiment of the present invention, the thermochromic window may further include a barrier film disposed between the substrate and the thermochromic thin film.

The barrier film may have a composition that includes one material selected from the group consisting of silicon dioxide ($SiO_2$), aluminum oxide ($Al_2O_3$), niobium pentoxide ($Nb_2O_5$), titanium dioxide ($TiO_2$) and silicon nitride ($Si_3N_4$).

The barrier film may further include a dopant.

The dopant may be one selected from the group consisting of Mo, W, Cr, Ni and Zr.

The thermochromic material may be one material selected from the group consisting of vanadium dioxide ($VO_2$), titanium (III) oxide ($Ti_2O_3$), niobium oxide ($NbO_2$) and nickel sulfide (NiS).

In another aspect of the present invention, provided is method of manufacturing a thermochromic window. The method includes the following steps of: forming a dopant layer on a substrate and forming a thermochromic thin film by depositing a thermochromic material on the dopant layer so that a dopant that constitutes the dopant layer diffuses into the thermochromic material.

The method may further include the step of post-annealing a resultant structure after the step of forming the thermochromic thin film.

The method may further include the step of forming a barrier film on the substrate before the step of forming the dopant layer. The dopant layer may be formed on the barrier film.

The thickness of the dopant layer may be 5 nm or less. It is preferable that the thermochromic material be vanadium dioxide ($VO_2$) and that the thickness of the thermochromic thin film may be at least 50 nm.

The step of forming the thermochromic thin film may be implemented as sputtering.

According to embodiments of the invention, the dopant is added to only a predetermined area of the thermochromic thin film doped with a concentration gradient in the depth direction from one surface of the upper surface and the undersurface of the thermochromic thin film, such that the thermochromic window doped with the dopant has a high level of visible light transmittance and high phase change efficiency while having a low phase transition temperature.

In addition, since the barrier film is doped with the dopant, the refractive index of the barrier film can be increased, thereby increasing the transmittance of visible light.

The methods and apparatuses of the present invention have other features and advantages which will be apparent from, or are set forth in greater detail in the accompanying drawings, which are incorporated herein, and in the following Detailed Description of the Invention, which together serve to explain certain principles of the present invention.

DETAILED DESCRIPTION OF THE INVENTION

Figure 1:
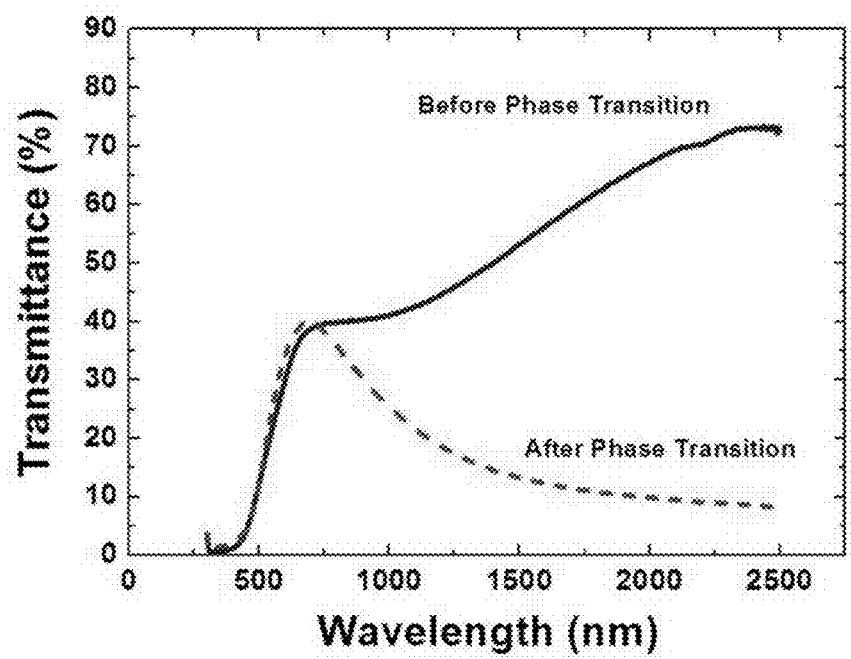
FIG. 1 is a graph showing variations in the level of sunlight transmittance of a thermochromic window before and after phase transition, in which one surface of a glass substrate is coated with a thermochromic thin film made of $VO_2$.

Reference will now be made in detail to a thermochromic window doped with a dopant and a method of manufacturing the same according to the present invention, embodiments of which are illustrated in the accompanying drawings and described below, so that a person having ordinary skill in the art to which the present invention relates can easily put the present invention into practice.

Throughout this document, reference should be made to the drawings, in which the same reference numerals and signs are used throughout the different drawings to designate the same or similar components. In the following description of the present invention, detailed descriptions of known functions and components incorporated herein will be omitted when they may make the subject matter of the present invention unclear.

Figure 2:
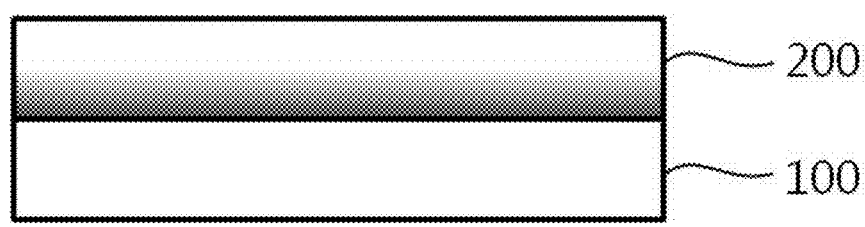
FIG. 2 is a schematic cross-sectional view showing an embodiment of a thermochromic window doped with a dopant according to the present invention.

FIG. 2 is a schematic cross-sectional view showing an embodiment of a thermochromic window doped with a dopant according to the present invention.

Referring to FIG. 2, the thermochromic window doped with a dopant according to this embodiment of the present invention includes a substrate 100 and a thermochromic thin film 200 which is made of a thermochromic material doped with the dopant, the concentration of the dopant gradually decreasing in a depth direction from one surface of the upper surface and undersurface of the thermochromic thin film.

In this fashion, the dopant is added to a predetermined area of the thermochromic thin film with a concentration gradient in the depth direction from the surface of the thermochromic thin film instead of being uniformly dispersed across the entire area of the thermochromic thin film. Accordingly, the thermochromic window doped with the dopant according to the invention can have a high level of visible light transmittance and high phase change efficiency while having a low phase transition temperature.

The substrate 100 is a base material which supports the thermochromic thin film 200, and can be preferably implemented as a soda-lime construction glass.

The thermochromic thin film 200 is formed on the substrate 100, and is made of the thermochromic material doped with the dopant. The concentration of the dopant gradually decreases with the depth from one surface of the upper surface and undersurface of the thermochromic thin film, as indicated by black gradation in FIG. 2.

The thermochromic material refers to a material, the crystalline structure of which changes due to the thermochromic phenomenon in which a phase transition occurs at a specific temperature (phase transition temperature) to the extent that physical properties (such as electrical conductivity and infrared (IR) transmittance) significantly change. The ability of the thermochromic material to block sunlight, in particular, IR radiation or the level of sunlight transmittance, in particular, the IR radiation transmittance of the thermochromic material changes before and after the phase transition. The thermochromic material can be made of one selected from among, but not limited to, vanadium dioxide ($VO_2$), titanium (III) oxide ($Ti_2O_2$), niobium dioxide ($NbO_2$), and nickel sulfide (NiS).

The dopant in the thermochromic material lowers the phase transition temperature of the thermochromic thin film 200.

The higher the doping ratio of the dopant is, the lower the phase transition temperature of the thermochromic thin film 200 becomes. The dopant can be at least one selected from among Mo, W, Cr, Ni and Zr.

Figure 3:
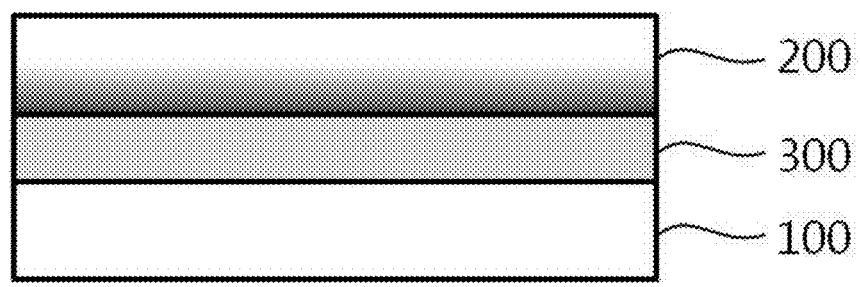
FIG. 3 is a schematic cross-sectional view showing another embodiment of the thermochromic window doped with a dopant according to the present invention.

In addition, the thermochromic window doped with the dopant according to the invention can also include a barrier film 300 which is formed between the substrate 100 and the thermochromic thin film 200, as shown in FIG. 3.

In general, the process of forming the thermochromic thin film by depositing the thermochromic material is carried out at a high temperature. When the thermochromic material that is being directly applied as a coating on the substrate, ions inside the substrate diffuse into the thermochromic material, such that the thermochromic material loses the thermochromic characteristic.

Therefore, according to an embodiment of the invention, the barrier film 300 is formed between the substrate 100 and the thermochromic thin film 200. The barrier film 300 can act as a diffusion barrier that prevents ions inside the substrate 100 from diffusing into the thermochromic thin film 200. In particular, when the substrate 100 is a soda-lime glass substrate, the barrier film 300 can prevent sodium (Na) ions inside the glass substrate from diffusing into the thermochromic thin film 200.

Here, the barrier film 300 can be implemented as an oxide or a nitride thin film, and more preferably, be made of one material selected from among, but not limited to, $SiO_2$, $Al_2O_3$, $Nb_2O_5$, $TiO_2$ and $Si_3N_4$.

In addition, the barrier film 300 can be doped with a dopant in order to increase the refractive index thereof, thereby improving the level of visible light transmittance. The dopant can be one selected from among, but not limited to, Mo, W, Cr, Ni and Zr.

A description will be given below of an embodiment of a method of manufacturing a thermochromic window doped with a dopant according to the invention.

Figure 4:
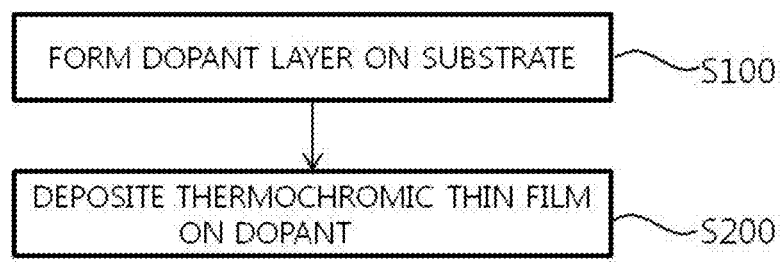
FIG. 4 is a schematic flowchart showing an embodiment of a method of manufacturing a thermochromic window doped with a dopant according to the present invention.

FIG. 4 is a schematic flowchart showing an embodiment of the method of manufacturing a thermochromic window doped with a dopant according to the present invention.

Referring to FIG. 4, in order to manufacture the thermochromic window doped with a dopant according to the present invention, at a first step S100, a dopant layer is formed on a substrate.

The dopant layer formed on the substrate can be made of one selected from among, but not limited to, Mo, W, Cr, Ni and Zr.

The thickness of the dopant layer may be about 5 nm. It is preferred that the thickness of the dopant layer range from 1 to 2 nm. Since the dopant layer is formed as an ultrathin film like this, all of dopant atoms of the dopant layer will diffuse into a thermochromic thin film in the subsequent process of forming the thermochromic thin film.

However, the thickness of the dopant layer may differ depending on the thickness of the thermochromic thin film.

Afterwards, at S200, the thermochromic thin film is formed by depositing a thermochromic material on the dopant layer.

Since the thermochromic material is deposited at a high temperature, the dopant of the dopant layer diffuses during the deposition of the thermochromic material, and the thermochromic thin film is doped with the diffused dopant during the deposition. This consequently forms the thermochromic thin film doped with the dopant, the concentration of the dopant gradually decreasing in a depth direction from the surface of the thermochromic thin film.

In an example, when a vanadium dioxide ($VO_2$) thin film having a thickness of 50 nm is formed via sputtering on a dopant layer which is formed at a thickness ranging from 1 to 2 nm on a substrate, all of the dopant atoms of the dopant layer diffuse into the $VO_2$ thin film in the deposition process of $VO_2$ which is carried out at a temperature ranging from 400 to 500° C.

Since only the portion of the thermochromic thin film that ranges from the surface to a predetermined depth is doped with the dopant in this way, the visible light transmittance and the phase transition efficiency of the thermochromic window doped with the dopant can be improved.

In addition, it is possible to adjust the depth of the thermochromic thin film which is to be doped with the dopant by controlling the thickness of the dopant layer and the deposition process, thereby easily controlling the visible light transmittance. In addition, it is possible to easily control the amount of the dopant that is to diffuse into the thermochromic thin film by adjusting the thickness of the dopant layer.

The method of manufacturing a thermochromic window doped with a dopant according to the present invention can also include a post-annealing step after the step S200 of forming the thermochromic thin film.

When the dopant layer remains because all of the dopant atoms of the dopant layer have not diffused into the thermochromic thin film at the step S200 of forming the thermochromic thin film, the method can also include the post-annealing step of heat-treating the multilayer structure that includes the substrate, the dopant layer and the thermochromic thin film so that all of the dopant of the remaining dopant layer diffuse into the thermochromic thin film.

In addition, the method of manufacturing a thermochromic window doped with a dopant according to the present invention can also include the step of forming a barrier film on the substrate before the step S100 of forming the dopant layer.

That is, the method can also include the step of forming the barrier film between the substrate and the dopant layer. The barrier film serves as a diffusion barrier that prevents ions in the substrate from diffusing into the thermochromic thin film. This is intended to prevent ions inside the substrate from diffusing along with the dopant atoms in the dopant layer into the thermochromic thin film at the step S200 of forming the thermochromic thin film.

In addition, this barrier film is also doped with the dopant which diffuses into the barrier film at the step S200 of forming the thermochromic thin film on the barrier film. This can consequently increase the refractive index of the barrier film, thereby increasing the visible light transmittance of the thermochromic window to which the dopant is added.

The foregoing descriptions of specific exemplary embodiments of the present invention have been presented with respect to the drawings. They are not intended to be exhaustive or to limit the invention to the precise forms disclosed, and obviously many modifications and variations are possible for a person having ordinary skill in the art in light of the above teachings.

It is intended therefore that the scope of the invention not be limited to the foregoing embodiments, but be defined by the Claims appended hereto and their equivalents.

What is claimed is:

1. A thermochromic window comprising:
a substrate; and
a thermochromic thin film formed on the substrate,
wherein the thermochromic thin film comprises a thermochromic material doped with a dopant, a concentration of the dopant gradually decreasing in a depth direction from one surface of an upper surface and an undersurface of the thermochromic thin film.

2. The thermochromic window of claim 1, further comprising a barrier film disposed between the substrate and the thermochromic thin film.

3. The thermochromic window of claim 2, wherein the barrier film has a composition that includes one material selected from the group consisting of silicon dioxide ($SiO_2$), aluminum oxide ($Al_2O_3$), niobium pentoxide ($Nb_2O_5$), titanium dioxide ($TiO_2$) and silicon nitride ($Si_3N_4$).

4. The thermochromic window of claim 2, wherein the barrier film further includes a dopant.

5. The thermochromic window of claim 1, wherein the dopant is one selected from the group consisting of Mo, W, Cr, Ni and Zr.

6. The thermochromic window of claim 4, wherein the dopant is one selected from the group consisting of Mo, W, Cr, Ni and Zr.

7. The thermochromic window of claim 1, wherein the thermochromic material comprises one material selected from the group consisting of vanadium dioxide ($VO_2$), titanium (III) oxide ($Ti_2O_3$), niobium oxide ($NbO_2$) and nickel sulfide (NiS).

8. A method of manufacturing a thermochromic window, comprising:
   forming a dopant layer on a substrate; and
   forming a thermochromic thin film by depositing a thermochromic material on the dopant layer so that a dopant that constitutes the dopant layer diffuses into the thermochromic material.

9. The method of claim 8, further comprising post-annealing a resultant structure after forming the thermochromic thin film.

10. The method of claim 8, further comprising forming a barrier film on the substrate before forming the dopant layer, wherein the dopant layer is formed on the barrier film.

11. The method of claim 8, wherein a thickness of the dopant layer is 5 nm or less.

12. The method of claim 8, wherein the thermochromic material comprises vanadium dioxide ($VO_2$), and a thickness of the thermochromic thin film is at least 50 nm.

13. The method of claim 8, wherein forming the thermochromic thin film comprises sputtering.

\* \* \* \* \*